Feb. 23, 1926.
R. K. WINNING
CONTROL SHAFT MOUNTING
Filed Dec. 5, 1925
1,573,960
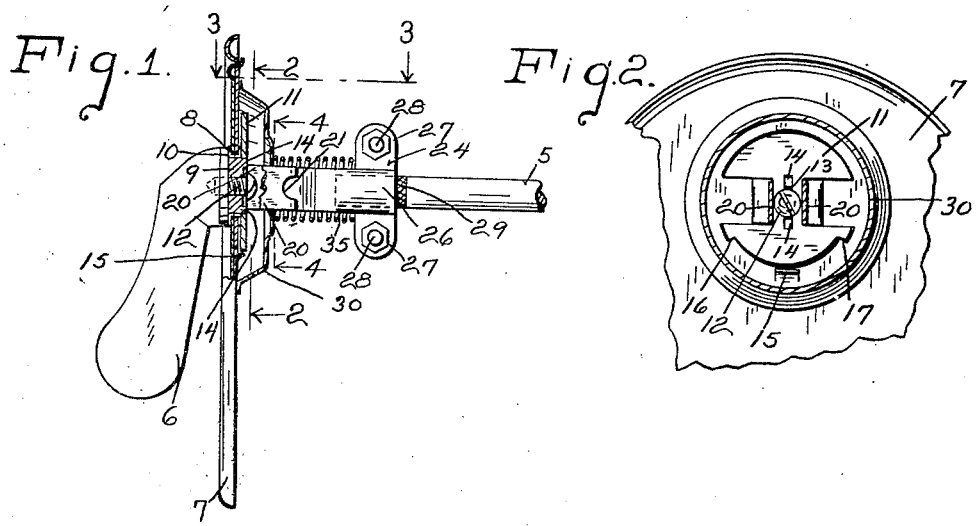
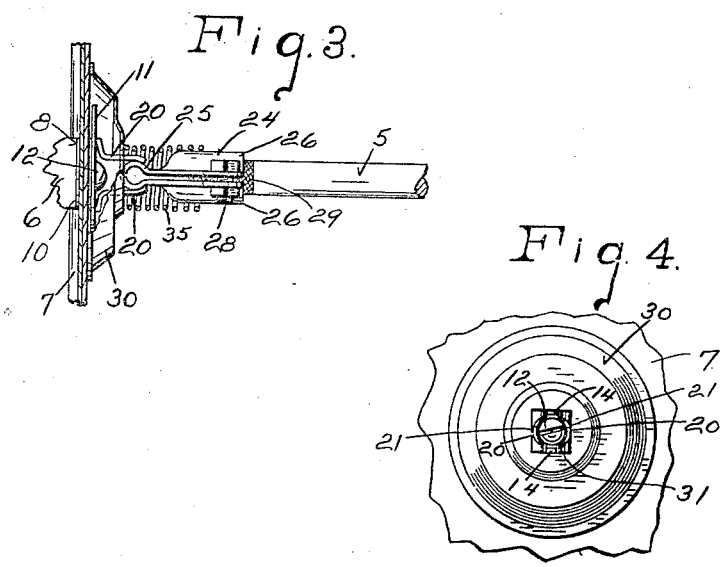
INVENTOR.
Robert K. Winning
BY
Erwin, Wheeler & Woolard
ATTORNEYS.

Patented Feb. 23, 1926.

1,573,960

UNITED STATES PATENT OFFICE.

ROBERT K. WINNING, OF WAUWATOSA, WISCONSIN, ASSIGNOR TO CLUM MANUFACTURING COMPANY, OF MILWAUKEE, WISCONSIN.

CONTROL-SHAFT MOUNTING.

Application filed December 5, 1925. Serial No. 73,464.

*To all whom it may concern:*

Be it known that I, ROBERT K. WINNING, a citizen of the United States, residing at Wauwatosa, county of Milwaukee, and State of Wisconsin, have invented new and useful Improvements in Control-Shaft Mountings, of which the following is a specification.

This invention relates to improvements in control shaft mountings. It is the object of the invention to provide a novel and improved shaft mounting which will flexibly connect a control lever and shaft and will utilize for the purposes of such connection a portion of mechanism which is additionally employed to maintain the shaft and lever subject to a constant frictional resistance against movement.

In the drawings:

Figure 1 is a vertical axial section through a device embodying this invention.

Figure 2 is a section taken on line 2—2 of Figure 1.

Figure 3 is a section taken on line 3—3 of Figure 1.

Figure 4 is a section taken on line 4—4 of Figure 1.

Like parts are indentified by the same reference characters throughout the several views.

This particular embodiment of the invention is intended for use in the automotive industry in connection with the control of a carburetor or similar function. The shaft 5 is a control shaft which may lead to a check valve on the carburetor. It is desired to provide for connecting such shaft to the oscillatory hand lever 6 through means which will permit a limited degree of relative universal movement.

A mounting plate 7 adapted to be secured in any desired manner to the instrument board of a motor vehicle is penetrated by an eyelet 8 which provides a bearing for the reduced extremity 9 of handle 6. The shoulder 10 of said handle abuts the outer surface of the eyelet 8 and the handle is held in this position by means of a disk 11 abutting the inner face of the mounting plate 7 and secured to the handle by a screw 12. Disk 11 is notched at 13 to receive lugs 14 on the handle whereby the disk is keyed to the handle for rotation therewith.

A tongue 15 may be struck up from one of the plies of material comprising the mounting plate 7 in a position to lie between shoulders 16 and 17 on the disk 11, whereby to limit the degree of oscillation of the disk.

Formed integrally with the disk are the axially projecting arms 20, the extremities of which are curved inwardly as best shown in Figure 3. In order to permit the introduction of screw 12 between the inwardly curved extremities of these arms such extremities are preferably cut away as shown at 21 in Figures 1 and 4.

Shaft 5 carries a fitting 24 which is formed integrally to provide a transverse cylinder 25 and a pair of axially extending semi-tubular portions 26 at its ends. Registering ears 27 connected with each semi-tubular portion 26 are apertured to receive bolts 28, whereby the semi-tubular elements 26 may be clamped together about the knurled end 29 of shaft 5.

The cylindrical body 25 formed integrally in the intermediate portion of the strip of material which comprises fitting 24 is of such a diameter as to be embraced between the curved extremities of arm 20. Thereby the rotative movement of handle 6 and disk 11 is imparted to fitting 24 and thence to shaft 5. At the same time the shaft is free to oscillate about the axis of the cylindrical body 25 within the limits permitted by the partially embracing curved extremities of arms 20. The entire shaft 5 and fitting 24 are also free to move axially toward the mounting plate between arms 20. They are restrained against such movement only by the compression of the spring hereinafter to be described.

A saucer-shaped concave friction member 30 encloses disk 11 and is provided with a rectangular opening 31 which fits closely about the arms 20. The margins of the aperture 31 not only prevent any possible spreading of arms 20 but furthermore serve to connect the friction plate 30 to the disk 11 for oscillation therewith.

The friction plate 30 is in frictional contact with the rear surface of the mounting plate 7. The compression spring 35 encircles and fits closely about arms 20, being preferably in contact with such arms at their margins. Spring 35 seats against the friction member 30 at one of its ends and seats against the ears 27 at its other end. This spring is under compression sufficient to force control shaft 5 and fitting 24 bodily rearwardly to the limit permitted by the engagement between the cylindrical body 25 and the inwardly curved extremities of arms 20. The spring permits of relative oscillation of shaft 5 in a vertical plane with respect to arms 20. If shaft 5 is displaced in a vertical plane one end of the cylindrical body 25 will remain in contact with the associated portion of arms 20 and the other end will be forced inwardly toward the mounting plate to the extent to which the oscillation occurs. Obviously this oscillation will be opposed by the compression of one side of spring 35 and accordingly there will constantly be a tendency for the spring to maintain shaft 5 in alignment with the axis of oscillation of handle 6.

In addition to this function of spring 35 the spring also maintains the device under a proper degree of friction by forcing the member 30 into contact with the rear face of the mounting plate. The spring furthermore operates to maintain the control shaft assembly in detachable connection with the handle and related parts. In assembling this device the spring is compressed on fitting 24 in the direction of ears 27 to expose the cylindrical body 25. Such body may thereupon be slipped freely in a transverse direction between arms 20 to the position illustrated in the drawings, wherein the body is engaged between the said arms. The spring 35 being released at this time embraces the ends of arms 20 and thereby confines body 25 against escape from between said arms. To release body 25 for transverse movement from between said arms it is only necessary to retract spring 35 again upon fitting 24 sufficiently to clear the extremities of arms 20. Thereupon the entire control shaft assembly may be disengaged by lateral movement from the actuating mechanism.

It will be observed, therefore, that spring 35 performs three distinct functions in providing the necessary pressure for frictional resistance to shaft movement, in detachably securing the control shaft and its actuating mechanism together, and in yieldably opposing disalignment of the control shaft from the axis of oscillation of the lever.

The disc 11 has many functions in that it mounts handle 6 upon the plate 7, it secures the handle removably to the friction member 30 in order that these parts may rotate together, and it includes a part of the universal joint mechanism whereby the rotation or oscillation of handle 6 is transmitted to shaft 5. In addition the disk 11 provides stop or limiting mechanism for fixing the degree of oscillation of the lever.

The friction member 30 performs the several functions of providing friction to hold the lever and shaft in any desired position of adjustment, of housing disk 11 and related parts, and of re-enforcing the arms 20 against possible separation.

I claim:

1. The combination with an actuating member, of a driven shaft fitting provided with a laterally disengageable connection with said member, and an axially yieldable annulus encircling a portion of said member and a portion of said fitting and adapted to secure said fitting and said member against disengagement.

2. In a device of the character described, the combination with a mounting and a handle supported therein for oscillation, of a fitting connected with said handle, a friction member splined to said fitting and in frictional engagement with said mounting, a second fitting adjustably connected with said first fitting and disengageable therefrom upon the occurrence of relative lateral movement between said fitting, and a spring encircling said fittings and securing said fittings against such lateral movement, said spring bearing on said friction member and pressing said member in the direction of said mounting.

3. In a device of the character described, the combination with an actuating handle and an oscillatory shaft, of means including an encircling spring releasably connecting said shaft and said handle, and a friction device acted upon by said spring and connected for rotation with said handle, whereby to maintain said handle frictionally in a desired position of adjustment.

4. The combination with a shaft and an actuating member in joined connection therewith, said shaft and member being detachable at said joint upon relative lateral movement, a spring encircling said member and said shaft at said joint, and a friction device including a friction member in slidable bearing contact with said actuating member and acted upon by said spring, said spring being adapted releasably to maintain said actuating member and shaft against relative lateral movement.

5. In a device of the character described, the combination with a headed shaft, of an actuating member provided with a laterally opening bearing for the head of said shaft, a mounting for said actuating member, a friction device movable with respect to said mounting and secured for oscillation with said actuating member, and a spring seated upon said device and encircling said bearing in a manner adapted to confine the headed extremity of said shaft therein.

6. The combination with a mounting plate, of a handle extending therethrough, a disk secured to said handle and provided with spaced axially extending arms inwardly curved at their extremities, a driven shaft aligned with the axis of oscillation of said handle, a cylindrical head connected with said shaft and laterally slidable between said arms, said head being of a diameter to be engaged between the inwardly curved extremities of said arms, a friction member housing said disk and slidably connected with said arms for movement to and from said plate, and a spring encircling the extremities of said arms and seated against said friction member and against a portion of said shaft.

7. An actuating member comprising an oscillatory pair of arms having inwardly curved extremities, a mounting plate supporting said member, and a housing apertured to fit about said arms at a point remote from said mounting plate, whereby to secure said arms against separation.

8. An actuating member comprising an oscillatory pair of arms having inwardly curved extremities, a mounting plate supporting said member, a housing apertured to fit about said arms at a point remote from said mounting plate, whereby to secure said arms against separation, a spring encircling said arms and seated upon said housing to urge said housing in the direction of said mounting plate, and a shaft flexibly connected between said arms to receive rotation therefrom.

9. An actuating member comprising an oscillatory pair of arms having inwardly curved extremities, a mounting plate supporting said member, a housing apertured to fit about said arms at a point remote from said mounting plate, whereby to secure said arms against separation, a spring encircling said arms and seated upon said housing to urge said housing in the direction of said mounting plate, and a shaft flexibly connected between said arms to receive rotation therefrom, said shaft being laterally disengageable from between said arms and being detachably secured therebetween by said spring.

10. An actuating member comprising an oscillatory pair of arms having inwardly curved extremities, a mounting plate supporting said member, a housing apertured to fit about said arms at a point remote from said mounting plate, whereby to secure said arms against separation, a spring encircling said arms and seated upon said housing to urge said housing in the direction of said mounting plate, and a shaft flexibly connected between said arms to receive rotation therefrom, said shaft being provided with a head laterally disengageable from between said arms and adapted to be retained by the inwardly curved extremities of said arms and by said spring, said shaft providing a seat for said spring opposed to said housing.

11. The combination with an apertured mounting plate and a handle extending therethrough, of a disk connected with said handle and bearing against said plate, arms projecting rearwardly from said disk in mutually spaced relation and provided with inwardly curved extremities, a concave friction member apertured to fit about said arms intermediate their ends and bearing against said mounting plate, a shaft provided with a head engaged between the inwardly curved ends of said arms and universally adjustable therebetween, said shaft and arms being disengageable by relative lateral movement, a spring seat connected with said shaft, and a spring confined between said spring seat and said concave friction member in a position to restrict relative lateral movement between said shaft and arms and to press said friction member against said mounting plate.

ROBERT K. WINNING.